United States Patent [19]
Thomas

[11] Patent Number: 5,362,113
[45] Date of Patent: Nov. 8, 1994

[54] SPOT-WELDED END FITTING FOR FLEXIBLE METAL PIPING

[75] Inventor: Roy W. Thomas, Attica, Ind.

[73] Assignee: Tru-Flex Metal Hose Corp., West Lebanon, Ind.

[21] Appl. No.: 939,135

[22] Filed: Sep. 2, 1992

[51] Int. Cl.⁵ .............................................. F16L 13/02
[52] U.S. Cl. ................................... 285/286; 285/903; 138/135
[58] Field of Search ............... 138/154, 150, 134, 135; 285/286, 424, 903

[56] References Cited

U.S. PATENT DOCUMENTS

| | | | |
|---|---|---|---|
| 2,257,895 | 10/1941 | Woodford et al. | 285/286 |
| 2,365,181 | 12/1944 | Fentnese | 285/286 |
| 2,419,453 | 4/1947 | Kocevar . | |
| 2,420,153 | 5/1947 | Sprenger et al. | 285/286 |
| 2,516,631 | 7/1950 | Jacobson | 285/286 |
| 2,628,111 | 2/1953 | Smalline . | |
| 2,857,176 | 10/1958 | McTaggart et al. . | |
| 2,867,242 | 1/1959 | Harris et al. | 138/135 |
| 3,056,616 | 10/1962 | Jaros . | |
| 3,086,516 | 4/1963 | Kanter | 138/134 |
| 3,135,295 | 6/1964 | Ziebold | 285/286 |
| 3,169,785 | 2/1965 | Ziebold | 285/286 |
| 3,393,267 | 7/1968 | Busse . | |
| 3,549,176 | 12/1970 | Contreras | 285/286 |
| 3,623,513 | 11/1971 | Dinkelkamp | 138/135 |
| 3,759,552 | 9/1973 | Levinsohn et al. . | |
| 4,811,976 | 3/1989 | Yagisawa . | |
| 5,015,018 | 5/1991 | Arnoldt | 285/367 |

FOREIGN PATENT DOCUMENTS

| | | | |
|---|---|---|---|
| 813071 | 3/1981 | U.S.S.R. | 285/286 |
| 1613777 | 12/1990 | U.S.S.R. | 285/286 |

Primary Examiner—Eric K. Nicholson
Attorney, Agent, or Firm—Lotman, McMahon & Brown

[57] ABSTRACT

A flexible piping and fitting assembly includes a section of flexible piping formed by spiral-winding a band with interlocking leading and trailing edges. The piping includes a bore. A fitting with a generally cylindrical inner section, an annular band an outer section in connected to the piping by spot-welding at multiple locations. The spot-welds can be circumferentially spaced and can extend through multiple layers of the flexible piping and into the fitting.

7 Claims, 1 Drawing Sheet

U.S. Patent    Nov. 8, 1994    5,362,113
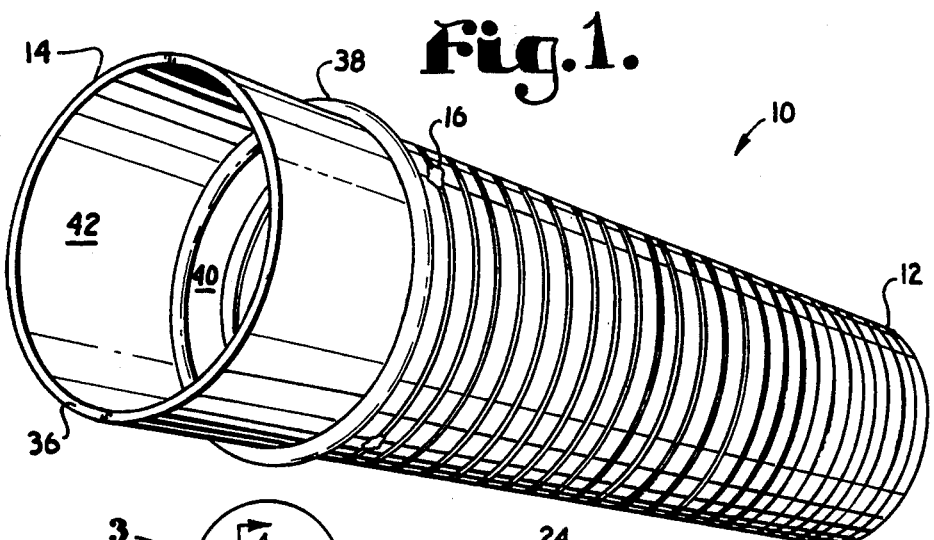
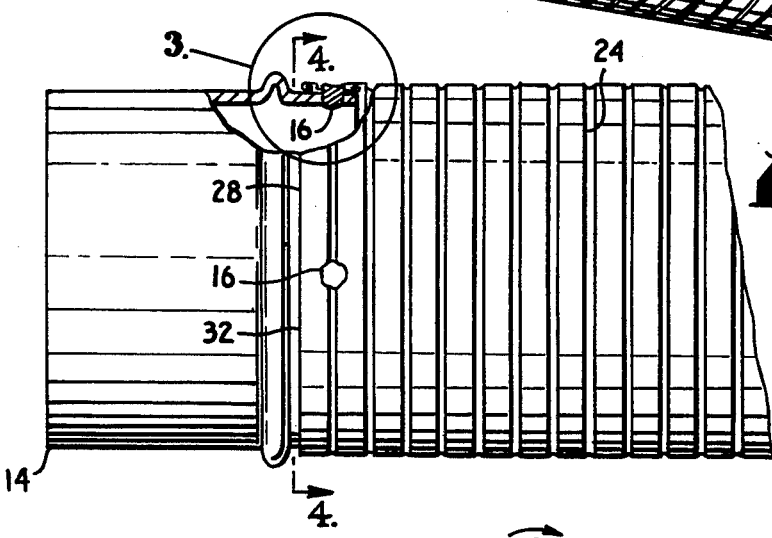
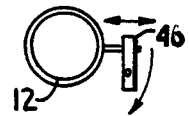
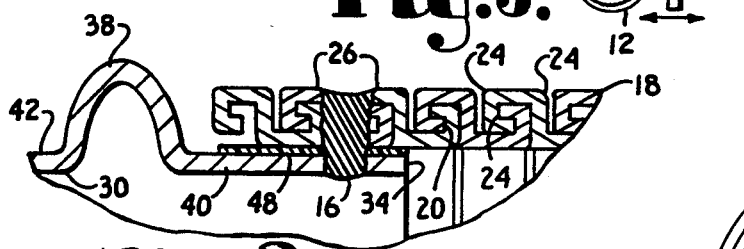
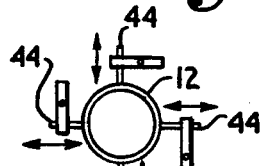
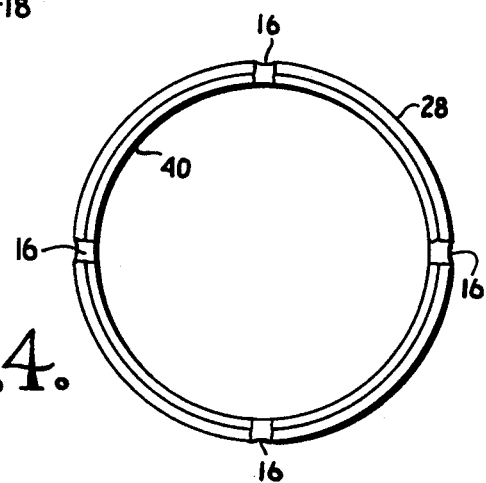

SPOT-WELDED END FITTING FOR FLEXIBLE METAL PIPING

BACKGROUND OF THE INVENTION

1. Field of the Invention

The present invention relates generally to hose and fitting assemblies, and in particular to a fitting spot-welded to a section of flexible, spiral-wound metal piping or hose.

2. Description of the Related Art

Piping, tubing and conduits are used to convey a variety of different types of matter, including solid and semi-solid bulk material (e.g. grain, sand, powder etc.), liquids and gases. End fittings are commonly attached to the ends of such piping, tubing and conduits for connection to the material handling equipment, other piping, receptacles, etc. Various methods have heretofore been proposed for attaching such fittings to piping, tubing, conduits and the like. For example, hose clamps are often utilized for connecting rubber hoses to various fittings. Adhesives can also be employed. Connections between metal piping and metal fittings can be made by welding and by various mechanical fasteners, such as rivets.

Flexible metal piping or hose is used for a variety of material handling applications, including conveying dry bulk materials such as solids, semi-solids, etc. Such flexible piping can be formed by spiral-winding continuous bands and interlocking the leading and trailing edges thereof. The interlocked seams thereof can permit flexure of the piping while providing relatively tight seams which are semi-pervious or impervious to most materials. Various methods have heretofore been employed for attaching fittings to such flexible metal piping. For example, annular welds have been formed around the piping ends and the fitting. However, such circular weldments can be expensive and time consuming, or can require special equipment for rotation of the welding equipment relative to the piping or for rotation of the piping relative to the welding equipment.

Spot-welding typically involves the placement of an electrically-charged electrode or welding wire against a workpiece with an opposite electrical charge. Spot-welding in commonly utilized for attaching two pieces of sheet metal together at point locations. Automated spot-welding equipment is available, and can utilize robotics for automated production of spot-welded items.

Heretofore there has not been available a method or apparatus for spot welding fittings on flexible metal hose or piping sections with the advantages and features of the present invention.

SUMMARY OF THE INVENTION

In the practice of the present invention, an apparatus is provided which comprises a section of flexible metal PIPING with a bore for receiving an inner section of a fitting. The flexible metal piping comprises spiral-wound metal bands with interlocked leading and trailing edges. The fitting is fixedly secured to the flexible metal piping by a plurality of spot-welds at circumferentially-spaced locations. In the practice of the method of the present invention, a length of flexible, metal piping is spiral-wound and is cut to provide a piping end. The method includes the steps of rotating welding equipment and the flexible metal piping relative to each other and spot-welding and the flexible metal piping to the fitting. Alternatively, multiple welding heads can be employed for simultaneously forming multiple spot-welds interconnecting the flexible metal piping and the fitting.

The drawings constitute a part of this specification and include exemplary embodiments of the present invention and illustrate various objects and features thereof.

OBJECTS AND ADVANTAGES OF THE INVENTION

The principle objects and advantages of the present invention include: providing a flexible metal piping and fitting assembly; providing such an assembly with the fitting spot-welded to the piping; providing such an assembly which can be spot-welded with available spot-welding equipment; providing such an assembly wherein spot-welds are utilized which extend through several flexible metal piping layers and into the fittings; providing such an assembly which utilizes multiple spot-welds circumferentially spaced around an annular intersection between the flexible metal piping and the fitting; providing such an assembly which is particularly well adapted for spiral-wound metal piping with interlocking seams; providing such an assembly with a relatively secure attachment of a fitting to a flexible metal piping end; providing a method of manufacturing a flexible metal piping and end fitting assembly; providing such a method which utilizes spot-welding equipment; providing such a method which provides for automated manufacture of assemblies comprising flexible metal piping and fittings.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of a flexible metal piping and fitting assembly embodying the present invention.

FIG. 2 is a side elevational view thereof.

FIG. 3 is an enlarged, longitudinal cross-sectional view thereof, particularly showing the interconnection of a flexible metal piping section and a fitting at a spot weld, taken generally within a circle 3 in FIG. 2.

FIG. 4 is a transverse, cross-sectional view thereof, particularly showing multiple spot-weld locations between the flexible metal piping and the fitting.

FIG. 5 is a schematic representation of the flexible metal piping being rotated as it is being welded.

FIG. 6 is a schematic view of the spot-welding equipment being rotated as it spot-welds flexible metal piping to the end fitting.

FIG. 7 is a schematic view of the piping in spot-welding equipment having multiple welding heads.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail the reference numeral 10 generally designates a spot-welded fitting and flexible piping assembly embodying the present invention. The assembly 10 generally includes a length of flexible piping 12, a fitting 14 and a plurality of spot-welds 16 interconnecting same.

II. Flexible Piping 12

The flexible piping 12 comprises a continuous, flat metal band 18 which has been spiral-wound with interlocked leading and trailing edges 20, 22 forming a spiral seam 24. Equipment for forming such piping are well known. On each side of the seam 24, the interlocked leading and trailing edges 20, 22 form spiral strips 26 whereat the flexible piping 12 has a thickness comprising four layers of metal. The interlocked leading and trailing band edges 20, 22 provide a certain degree of flexibility in the flexible piping 12 since the interlocked edges 20, 22 thereof shift slightly axially with respect to each other.

The flexible piping 12 terminates at an open end 28 and includes an axially-extending bore 30 open thereat. The piping end 28 is substantially perpendicular to the piping axis and forms a generally circular end edge 32. The piping 12 has an inside diameter ID and an outside diameter OD.

The band material comprise any suitable material, such as steel, stainless steel, aluminum, etc. The band material can be chosen for its properties of corrosion resistance, wear resistance, economy and ability to be formed into the desired shape.

III. Fitting 14

The fitting 14 has a generally cylindrical configuration with an outside diameter OD, inner and outer open ends 34, 36 and a throughbore 39 extending coaxially between and open at the ends 34, 36. Stop means an annular, outwardly-projecting ridge 38 is formed (e.g., by swaging) between the fitting ends 34, 36. The fitting 14 has inner and outer sections 40, 42 adjacent to its inner and outer ends 34, 36 respectively. The fitting inner section 40 has inside and outside diameters ID, OD. The assembly 10 is shown with the piping bore 30 receiving the fitting inner section 40 with the piping end 28 positioned in proximity to the projecting ridge 38. Alternatively, a fitting bore could receive flexible piping in a reverse of the assembly configuration shown in the drawings.

IV. Spot-Welds 16

With the fitting inner section 40 inserted in the piping bore 30 between the fitting inner end 34 and the fitting ridge or projection 38, the fitting 14 and the piping 12 are fixedly interconnected by the spot-welds 16. Various numbers of the spot-weld 16 can be employed. Without limitation on the generality of such numbers of spot-welds, four are shown spaced circumferentially at intervals of approximately 90 degrees. Each spot-weld 16 extends through four layers of band material and into the fitting 14. Such spot-welds 16 can be applied with conventional resistance welding equipment. Multiple spot-welding heads 44 can be employed for making the spot-welds 16 simultaneously (FIG. 7) at the different locations, or welding equipment 46 and the assembly 10 can be rotated relative to each other to form the spot-welds 16 sequentially (FIGS. 5 and 6).

Flexible pipe and fitting assemblies 10 embodying the present invention can be formed in various sizes and configurations. For example, various end fittings can be employed, such as: plain sleeve ends; male and female ends; threaded ends, etc. Flexible piping sections of various lengths can be utilized. Automated equipment can be employed for cutting the piping sections to various predetermined lengths and attaching the fittings. Robotics equipment can be used for automating the fabrication and assembly procedures for piping and fitting assemblies 10 of various sizes and configurations.

V. Operation

In operation, the spot-welds 16 provide a relatively secure connection between the flexible piping 12 and the fitting 14. An annular gasket 48 can be located between the fitting 14 and the flexible piping 12 to improve the fluid-tightness therebetween. The annular gasket 48 can be penetrated by the spot welds 16 as shown in FIG. 5. Also as shown in FIG. 5, each spot-weld location can be completely surrounded by the annular gasket 48. In this manner the integrity of the annular gasket 48 and its effectiveness in forming a fluid-tight seal between the piping 12 and the fitting 14 can be maintained, even at the location of the spot-welds 16, since the penetrations of the gasket 48 thereat would not provide a path for fluid to leak between the piping 12 and the fitting 14. Such flow leakage should be substantially blocked by the gasket material 48 completely surrounding the location of each spot-weld 16. Fluid-tightness can also be achieved maintaining relatively tight tolerances between the fitting OD and the piping bore ID or vice versa. Fluid-tightness can be further improved by using more spot-welds to more completely surround the piping 12 and the fitting 14. However, flexible piping 12 of the type shown is generally not regarded as fluid-tight unless provided with a liner, gasket material or sealing material. Therefore, fluid-tightness is often not required in applications which utilize flexible piping 12 of the type shown.

It is to be understood that while certain forms of the present invention have been illustrated and described herein, it is not to be limited to the specific forms or arrangement of parts described and shown.

What is claimed and desired to be secured by Letters Patent is as follows:

1. A spot-welded flexible metal piping and end fitting assembly, which comprises:
    (a) a length of flexible metal piping, which includes:
        (1) a generally continuous, spiral-wound metal band with interlocked leading and trailing edges;
        (2) a continuous spiral seam between said band edges, said interlocked leading and trailing band edges forming four layers of said band material at said spiral seam;
        (3) an open end;
        (4) a bore extending from and open at said end, said bore extending generally axially with respect to said flexible piping;
        (5) inside and outside diameters;

(b) an end fitting including an intersection with a generally cylindrical configuration, a throughbore, an inside diameter, an outside diameter, an inner end adjacent to said inner section, an outer section with an outer end adjacent to said outer section, said inner section and said outer section having substantially equal diameters;

(c) said fitting inner section being received in said piping bore;

(d) a plurality of resistance spot-welds spaced circumferentially in proximity to said piping open end, each said spot-weld extending through four layers of said band material at said spiral seam and into said fitting section and each said spot-weld being of a width sufficient to bridge said spiral seam and structurally fuse respective band leading and trailing edges and the coupling; and (e) an annular gasket positioned between said piping adjacent to the end thereof and said end fitting section.

2. A spot-welded flexible metal piping and end fitting assembly, which comprises:

(a) a length of flexible metal piping, which includes:
  (1) a generally continuous, spiral-wound metal band with interlocked leading and trailing edges;
  (2) a continuous spiral seam between said band edges, said interlocked leading and trailing band edges forming four layers of said band material at said spiral seam;
  (3) an open end;
  (4) a bore extending from and open at said end, said bore extending generally axially with respect to said flexible piping; and
  (5) inside and outside diameters;

(b) an end fitting including an inner section with a generally cylindrical configuration, a throughbore, an inside diameter, an outside diameter, an inner end adjacent to said inner section, an outer section with an outer end adjacent to said outer section, said inner section and said outer section having substantially equal diameters;

(c) said fitting inner section being received in said piping bore;

(d) a plurality of spot-welds spaced circumferentially in proximity to said piping open end, each said spot-weld extending through four layers of said band material at said spiral seam and into said fitting inner section; and (e) an annular gasket positioned between said piping adjacent to the open end thereof and said fitting inner section, each said spot-weld penetrating said gasket at a location surrounded by gasket material.

3. The invention of claim 1, which includes:
(a) said spot-welds being circumferentially spaced at intervals of approximately 90 degrees.

4. The invention of claim 1, which includes the step of:
(a) providing spot-welding equipment for forming spot-welds.

5. The invention of claim 1, which includes the addition of:
(a) rotating said flexible piping and said fitting relative to said spot-welding equipment to form multiple spot-welds.

6. The invention of claim 2, which includes the additional steps of:
(a) providing said spot-welding equipment with multiple spot-welding heads; and
(b) simultaneously actuating said multiple spot-welding heads for forming said multiple spot-welds.

7. The invention of claim 2, which includes the additional step of:
(a) rotating said spot-welding equipment relative to said flexible piping and fitting to form multiple spot welds.

* * * * *